No. 813,463. PATENTED FEB. 27, 1906.
G. W. STINEBRING.
SAWMILL.
APPLICATION FILED AUG. 27, 1904.
3 SHEETS—SHEET 1.
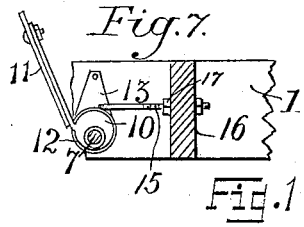
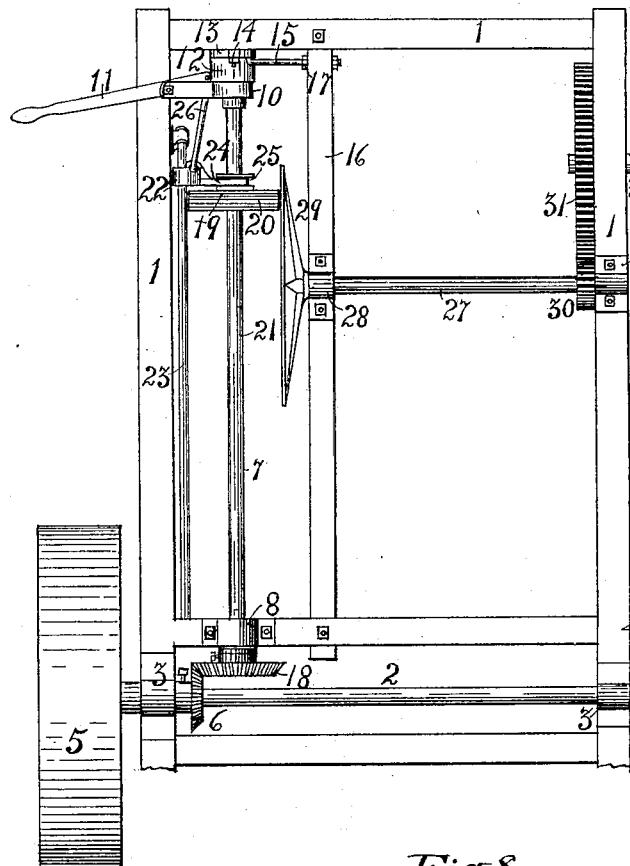
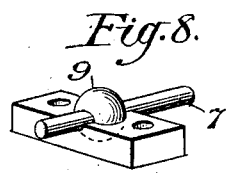
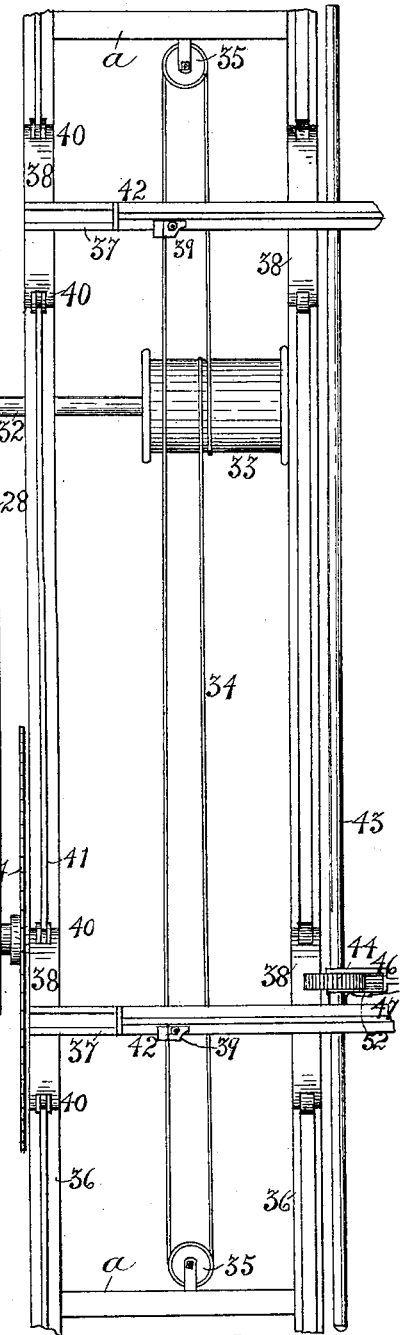
WITNESSES:
Earl L. Truffit.
H. E. Martz.
INVENTOR
George W. Stinebring
BY
Obed C. Billman
His Attorney

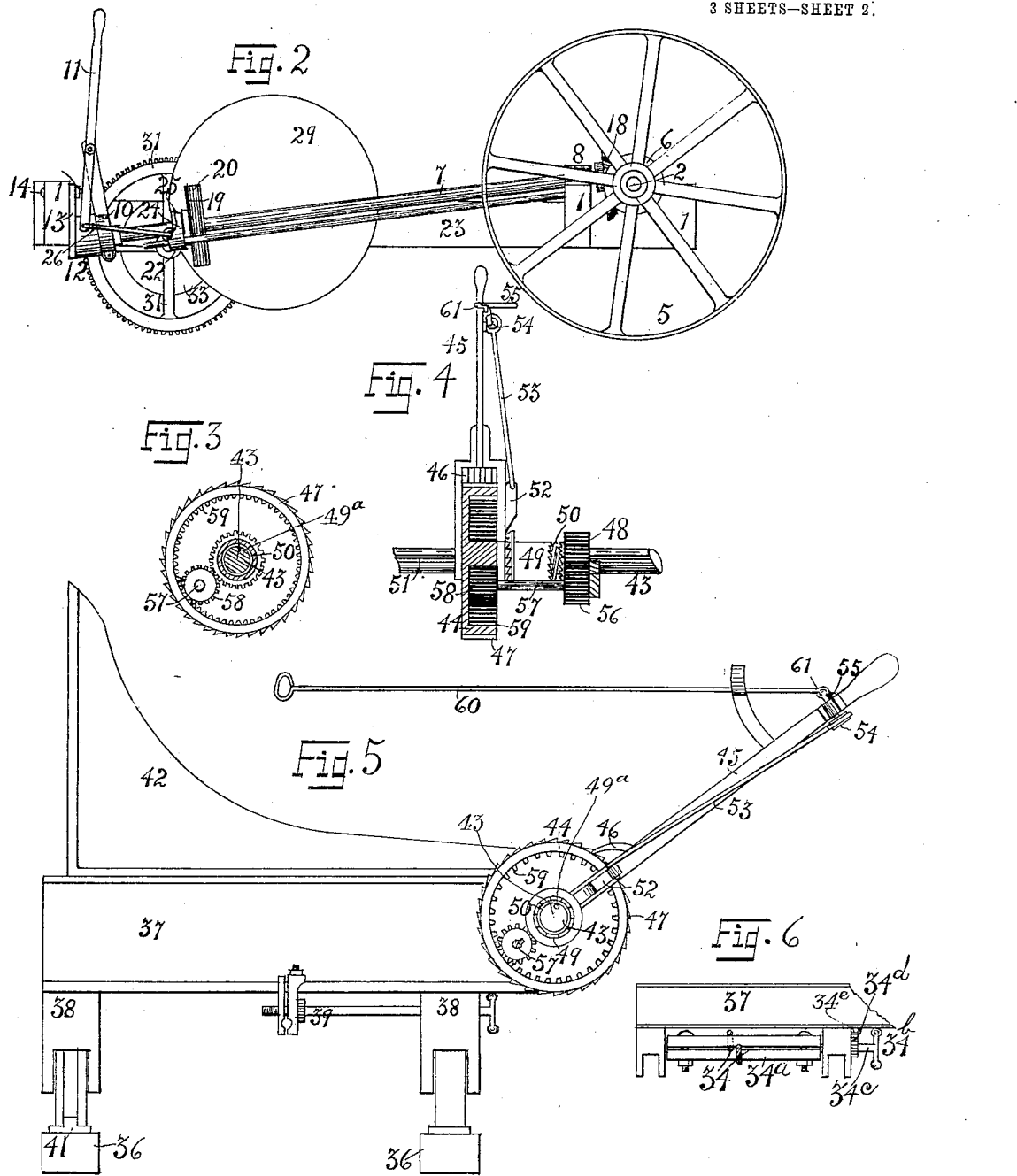

No. 813,463. PATENTED FEB. 27, 1906.
G. W. STINEBRING.
SAWMILL.
APPLICATION FILED AUG. 27, 1904.
3 SHEETS—SHEET 3.
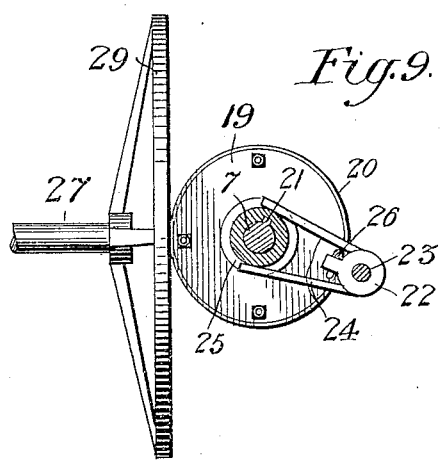
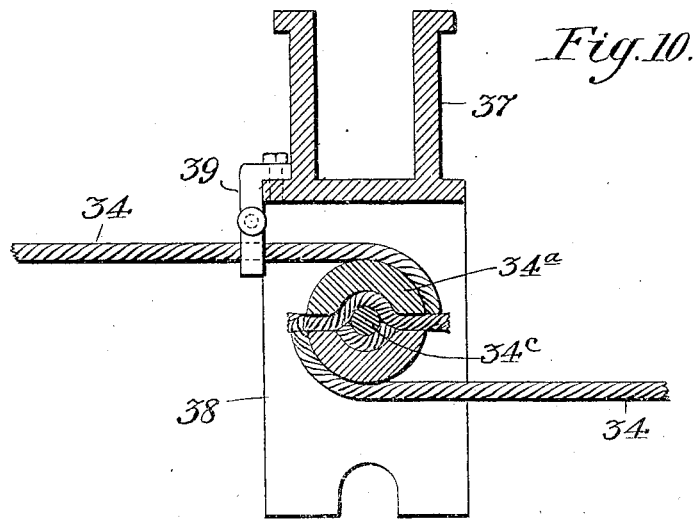
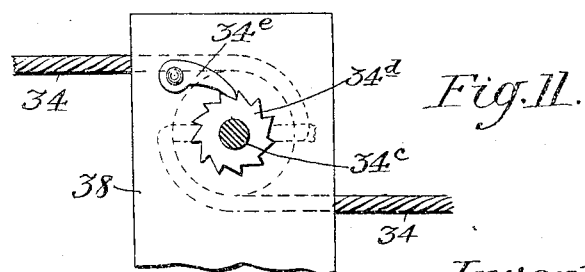
Witnesses:
E. G. Nofsger
W. L. Minzey
Inventor:
George W. Stinebring
By Obed C. Billman, Atty.

UNITED STATES PATENT OFFICE.

GEORGE W. STINEBRING, OF SHREVE, OHIO.

SAWMILL.

No. 813,463.  Specification of Letters Patent.  Patented Feb. 27, 1906.

Application filed August 27, 1904. Serial No. 222,373.

*To all whom it may concern:*

Be it known that I, GEORGE W. STINE-BRING, a citizen of the United States, residing at Shreve, in the county of Wayne and State of Ohio, have invented certain new and useful Improvements in Sawmills, of which the following is a specification.

My invention relates to improvements in sawmills; and it has for its object to provide a generally-improved device of this class which will be exceeding simple in construction and efficient in use and which shall be better adapted to its intended purposes than any other device of the same class with which I am acquainted.

The paramount object of the invention is to provide a simple and efficient carriage-feed mechanism for sawmills whereby the carriage may be moved forward at any desired speed of travel, to feed the material to the saw, and then to instantly and expeditiously return the carriage and move or set the material over for the next cut.

With these ends in view the invention consists in the novel construction, arrangement, and combination of parts hereinafter described, illustrated in the accompanying drawings, and particularly pointed out in the appended claims.

Referring now to the drawings forming a part of this specification, Figure 1 is a top plan view of my improved mill. Fig. 2 is a side elevation with one of the side beams removed to more clearly show the carriage-feed mechanism. Fig. 3 is an end view of the gear-wheels of the set-work mechanism. Fig. 4 is a side view of the same, partly in section, with operating-handle attached. Fig. 5 is an end view of the carriage with set-work mechanism attached, two of the end pinions of the same being removed. Fig. 6 is a detail view of the cable attaching and tightening device. Fig. 7 is a detail view of a movable bearing provided with an operating-lever. Fig. 8 is a perspective view of a movable spherical bearing formed at one end of one of the shafts. Fig. 9 is a detail view of a friction-disk and friction-wheel mechanism. Figs. 10 and 11 are detail views of the cable attaching and tightening device.

Similar numerals of reference designaet corresponding parts throughout all figures of the drawings.

In the accompanying drawings, 1 designates the saw-frame, upon which is mounted the saw and carriage-feed mechanism hereinafter described.

2 designates the saw-shaft, mounted in the usual manner in suitable bearings 3, secured to the top of the saw-frame and provided at one end with the saw 4 and at the other with the main driving-pulley 5.

6 designates a small bevel-gear mounted upon the saw-shaft 2 and secured thereto by means of a set-screw or in some other suitable and convenient manner.

7 designates a second shaft mounted at one end to the saw-frame by means of a bearing 8, consisting of a main or outer block or bearing and a second or inner block or bearing 9, the outer contour of which is spherical in form and which is provided with a central opening adapted to contain and form a bearing for the shaft 7. It will be seen upon referring to Fig. 2 that the shaft 7 is hung in an inclined position, and the lower end of the shaft 7 is eccentrically mounted in an eccentric block or bearing 10, provided with an operating-lever 11, pivotally attached thereto, and which said eccentric block or bearing 10 is mounted in a second block or bearing 12, formed at the lower end of a downwardly-extending depending bracket 13, secured at its upper end by means of a bolt 14 and braced at its sides by means of a bar 15, adjustably secured to a beam 16 of the saw-frame 1 by means of nuts 17. In this way the lower end of the bracket 13 may be moved laterally as may be desired, moving the shaft 7 with the inner block or bearing 9, above described.

18 designates a bevel-gear mounted on the upper end of the shaft 7 in any suitable and convenient manner and meshing with the small bevel-gear mounted upon the saw-shaft 2.

19 designates a friction-wheel slidably mounted on the shaft 7 and consisting of two parts or plates bolted or secured together in a suitable manner and carrying leather 20 or other suitable material interposed between the same. The friction-wheel 19 is secured to the shaft 7 by means of a flange or other suitable device which takes into a longitudinal groove 21 formed in the shaft 7 and is moved longitudinally thereon by means of a shifting block 22, slidably mounted on a guide-rod 23, secured to the saw-frame 1 in any suitable and convenient manner. The shifting block 22 is provided with two short arms or fingers 24, which take into an annular groove or recess 25, formed with the hub of the friction-wheel 19.

26 designates a rod secured at one end to the shifting block 22 and at the other or lower end secured to the operating-lever 11. It will thus be seen that by moving the operating-lever forwardly or rearwardly the friction-wheel 19 is moved correspondingly upon the shaft 7.

27 designates a shaft mounted in suitable bearings 28, one of which is secured to the saw-frame and the other of which is secured to the beam 16 and carrying upon one end a friction-disk 29, adapted to be engaged by the adjacent friction-wheel 19, and on the other a pinion 30, meshing with a gear-wheel 31, mounted upon the end of a shaft 32, mounted in suitable bearings, one of which in the present instance is secured to the under side of one of the sides of the saw-frame and the other to the under side of one of the beams comprised in the carriage-track to be hereinafter described.

33 designates a winding spool or drum about which there is wound a wire cable 34.

34$^a$ designates a winding-spool split in two parts and suitably secured beneath one of the knee-beds 37, (see Fig. 6,) between which are clamped the ends of the cable 34.

34$^b$ designates a handle secured to the ends of the shaft 34$^c$, provided with a ratchet-wheel and pawl 34$^d$ and 34$^e$, respectively.

The cable 34 passes over pulleys 35, secured to cross-ties $a$ near the ends of the carriage-track 36.

37 designates the knee-beds, mounted upon trucks 38 and to the lower portion of which is secured a clamping device 39, by means of which the knee-beds 37 are secured to the cable 34 and are moved forwardly and rearwardly upon the trucks 38, traveling upon the carriage-track 36.

40 designates grooved wheels mounted beneath the inner trucks 38 and which travel upon the flange-plate 41, mounted upon the top of the carriage-track 36 adjacent to the saw-frame 1. In this way the trucks 38 are always held securely upon the carriage-track 36.

42 designates knees of the usual construction slidably mounted upon the knee-beds 37 and moved upon said knee-beds 37 in the usual manner by means of a shaft 43, provided with pinions which engage a rack (not shown in drawings) formed on the under side of said knees 42.

The operation of the carriage and carriage-feed mechanism is as follows: When the saw is running, the friction-wheel 19 may be moved on the shaft 7 to a point opposite the friction-disk 29 by means of the operating-lever 11, and by moving the lever 11 outwardly, turning the attached eccentric bearing 10, the same will move the shaft 7 inwardly in an opposite direction to that in which the lever 7 has been moved, bringing the friction-wheel 19 into engagement with the friction-disk 29, which in the position shown in Fig. 1 will revolve the same and the connected carriage-moving mechanism, moving the carriage and feeding the material to the saw. To decrease the speed of the carriage-feed, the friction-wheel 19 is moved rearwardly on the shaft 7, bringing the friction-wheel 19 nearer to the periphery of the friction-disk 29 and decreasing the speed correspondingly. To return the carriage, the friction-wheel 19 is moved forwardly to a point beyond the center of the friction-disk 28, and the speed of the movement of the carriage may be regulated in the same manner as in the forward movement of the carriage.

44 designates a ratchet-wheel securely attached to the shaft 43 and designed to be operated by means of an operating-lever 45, pivotally attached to the shaft 43 adjacent to said ratchet-wheel 44 and provided with a series of pawls 46, which engage the ratchets 47 of the ratchet-wheel 44 when the lever 45 is moved forward.

48 designates a pinion loosely mounted on the shaft 43 and designed to be engaged and turned by a clutch 49, mounted on the shaft 43 intermediate the same and the ratchet-wheel 44 and normally held in engagement with the ratchet-wheel 44 and out of engagement with the pinion 48 by means of a coil-spring 50, interposed between the same and surrounding the shaft 43. The clutch 49 is provided with a key or flange 49$^a$, which takes into the recess 51, formed in shaft 43, and is adapted to be moved laterally thereon and into engagement with the pinion 48 by means of a plunger 52, suitably secured at the side of the operating-lever 45. Said clutch 49 is moved laterally by the downward thrust of the wedge-shaped plunger 52, operated by a rod 53, secured thereto and connected at its upper end to an eccentric head 54, pivotally mounted at the side of the operating-lever 45 and operated by means of a short arm or lever 55 formed therewith. 56 designates a second pinion meshing with the pinion 48 and securely mounted on one end of a short shaft 57, mounted in any suitable manner. 58 designates a third pinion secured on the other end of the shaft 57 and meshing with the cogs 59, formed about the inner periphery of the ratchet-wheel 44.

60 designates a handle-bar attached to an eye 61, formed with the lever 55 of the eccentric head 54 and designed to operate the operating-lever 45 and eccentric head 54 with its connections by twisting the same.

When it is desired to return the sliding knees 42 upon the knee-beds 37, the eccentric head is operated by means of the lever 55 or a twist of the handle-bar 60, and the plunger 52 is thrust downwardly, moving the clutch 49 laterally into engagement with the pinion 48, and it will thus be seen that as the ratchet-wheel 44 is moved forward by means of the operating-lever 45 the pinion 48, having engaged the clutch 49, (and the clutch 49 being out of engagement with the ratchet-wheel 44,) the shaft 43 will be caused to revolve in an opposite direction and return the sliding knees 42, as desired.

Various changes in the form, proportion, and the minor details of construction may be resorted to without departing from the principles or sacrificing any of the advantages of this invention.

Having thus explained the nature of my invention and described a way of constructing and using the same, although without having attempted to set forth all the forms in which it may be made or all the modes of its use, I declare that what I claim, and desire to secure by Letters Patent, is—

1. A sawmill feed mechanism, consisting of a saw-shaft, a second shaft geared thereto, a slidably-mounted friction-wheel mounted on said second shaft, a third shaft mounted at right angles to said second shaft and provided with a friction-disk adapted to be engaged by said friction-wheel, a fourth shaft suitably mounted and provided with a gear-wheel meshing with a pinion mounted on said second shaft, a winding-drum mounted on said fourth shaft, a carriage-track, pulleys secured near the ends of said carriage-track, a cable wound about said winding-drum and passing over said pulleys, carriages mounted on said carriage-track and provided with means for clamping to said cable, a winding-spool mounted beneath one of said carriages and adapted to engage the ends of said cable, a guide-rod mounted adjacent to said second shaft, a shifting block mounted on said guide-rod, an eccentric block or bearing taking over the lower end of said second shaft, a depending bracket pivotally secured at its upper end and carrying in its lower end said eccentric block or bearing, an adjustable bar secured to one side of said depending bracket whereby the same may be moved laterally, an operating-lever pivotally secured to said eccentric block or bearing, and a rod connecting the lower end of said operating-lever to said shifting block.

2. In a sawmill-carriage feed mechanism, the combination with a shaft suitably mounted on the saw-frame, a friction-disk mounted upon the end of said shaft, a second shaft mounted at right angles to said shaft, a double or two-part bearing formed near the upper end of said shaft, an eccentric bearing formed at the lower end thereof, an adjustably-mounted depending bracket secured to said frame and taking over said eccentric bearing a friction-wheel slidably mounted on said second shaft, and a groove or recess formed in the hub of said friction-wheel; of a guide-rod mounted adjacent to said second shaft, a shifting block mounted thereon, arms formed with said shifting block and adapted to take into said groove or recess formed in the hub of said friction-wheel, an adjustable bar secured to one side of said depending bracket, an operating-lever pivotally secured to said eccentric bearing, and a rod connecting the lever end of said operating-lever with said shifting block.

3. In a sawmill feed mechanism, the combination with a shaft provided at its end with a friction-disk, and a shaft mounted adjacent thereto and provided with a two-part friction-wheel adapted to be shifted on said last-mentioned shaft and thrown into and out of engagement with said friction-disk; of an eccentric block or bearing formed at the lower end of said last-mentioned shaft, a depending bracket provided at its lower end with a second block or bearing taking over said eccentric block or bearing and pivotally secured at its upper end to the saw-frame, and an adjustable bolt or bar secured to the lower side of said bracket whereby the same may be moved laterally.

4. In a sawmill feed mechanism, the combination with a shaft provided at its end with a friction-disk, a shaft suitably mounted and provided with a friction-wheel adapted to be shifted thereon and engage said friction-disk, a guide-rod mounted adjacent thereto, and a shifting block mounted on said guide-rod and adapted to engage said friction-wheel; of an eccentric block or bearing formed at the lower end of said last-mentioned shaft, a depending bracket pivotally secured at its upper end to the saw-frame, and carrying said eccentric block or bearing, an adjustable bar secured to the side of said depending bracket, an operating-lever secured to said eccentric bearing, and a rod connecting the lower end of said operating-lever to said shifting block.

In testimony whereof I have affixed my signature in presence of two witnesses.

GEORGE W. STINEBRING.

Witnesses:
ALBERT P. MERKEL,
E. K. GARDNER.